United States Patent [19]

Williams

[11] 4,198,760
[45] Apr. 22, 1980

[54] DOUBLE PUNCH INCLINOMETER

[75] Inventor: Henry L. Williams, Oklahoma City, Okla.

[73] Assignee: The Geolograph Company, Oklahoma City, Okla.

[21] Appl. No.: 9,063

[22] Filed: Feb. 5, 1979

[51] Int. Cl.² .............................................. G01C 9/12
[52] U.S. Cl. ...................................................... 33/311
[58] Field of Search .................. 33/311, 308, 310, 309

[56] References Cited

U.S. PATENT DOCUMENTS

| 2,624,952 | 1/1953 | MacLagan | 33/311 |
| 3,710,448 | 1/1973 | Kimmel et al. | 33/311 |
| 3,911,590 | 10/1975 | Litchfield et al. | 33/311 |
| 3,938,255 | 2/1976 | Lichte | 33/311 |

Primary Examiner—William D. Martin, Jr.
Attorney, Agent, or Firm—William S. Dorman

[57] ABSTRACT

An inclinometer for determining the inclination of a well bore including a longitudinally extending housing adapted to be lowered into the well bore to a given depth, a marking element mounted in the upper part of the housing and being suspended from a point along the central axis of the housing, the marking element having a marking tip at the lower end located on a true vertical line from the suspension point, a rotatable chart member having a chart thereon mounted in the housing below the marking element and normally spaced from the marking tip thereon, the chart member being movable along the longitudinal axis of the housing and upwardly into engagement with the marking tip, whereby the marking tip will make a mark on the chart, mechanism mounted within the housing for moving the chart member at two spaced times into engagement with the marking tip, the chart moving mechanism including means for rotating the chart during the interval between the two times while, simultaneously, insuring that the chart member is provided with axial movement only during the two times when the chart member is moved upwardly into engagement with the marking tip.

4 Claims, 7 Drawing Figures

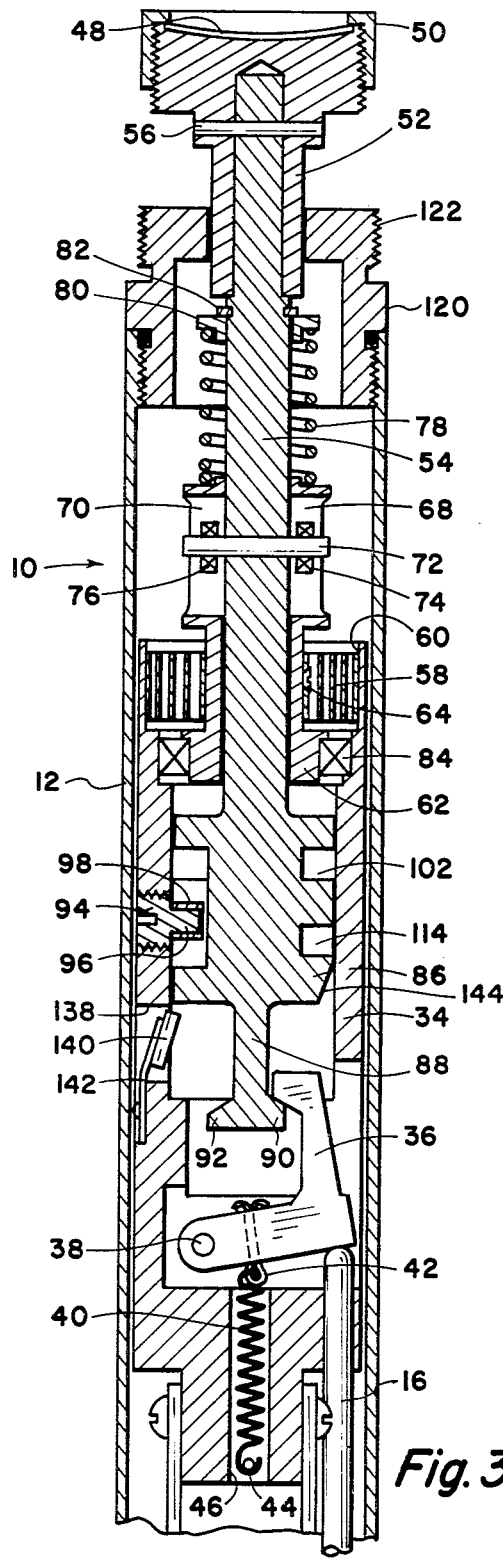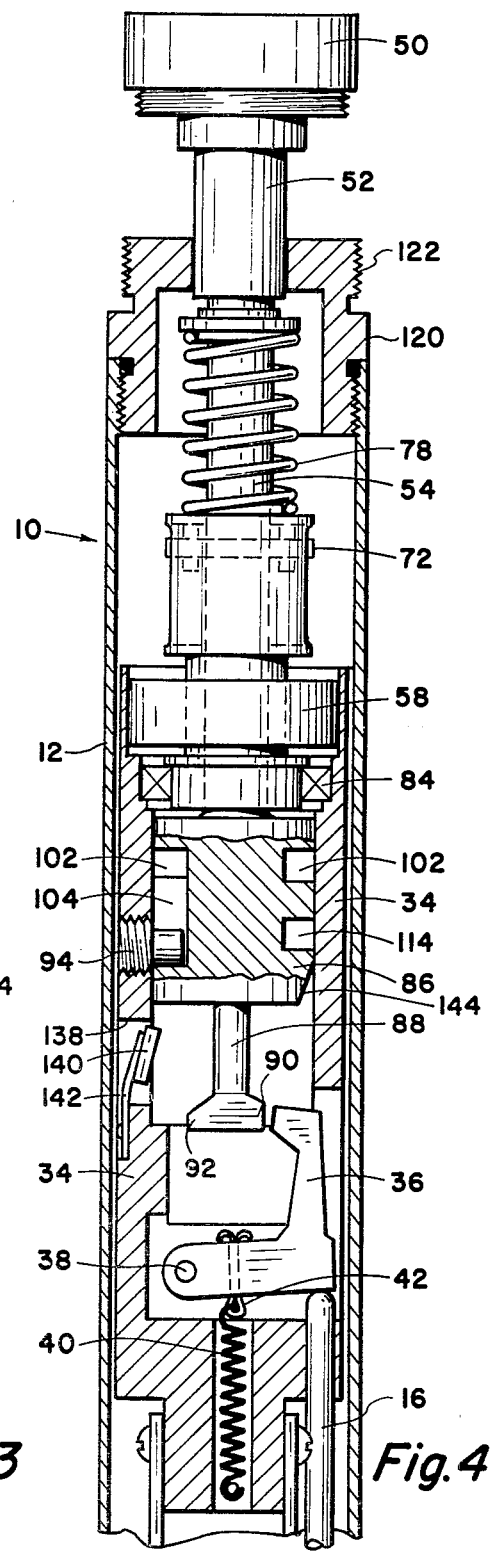

DOUBLE PUNCH INCLINOMETER

BACKGROUND OF THE INVENTION

1. Field of the Invention

The present invention relates to an inclinometer for determining the inclination of a well bore at a given depth; more particularly, the present invention relates to an inclinometer capable of providing two indications of the inclination over an interval of time and on a rotary chart where the indications are also circumferentially spaced.

2. Description of the Prior Art

Inclinometers for determining the inclination of a well bore at a given depth are old per se. Most inclinometers include an elongated cylindrical housing in which a plumb bob or pendulum is mounted so as to hang in a vertical position at all times. A needle or point at the bottom of the pendulum is adpated to place a mark or dimple on a circular chart which is moved into engagement with the pendulum at a predetermined time. The location of the mark or dimple on the chart is used to determine the inclination of the well bore. A typical single punch inclinometer is disclosed in U.S. Pat. No. 2,305,944; U.S. Pat. Nos. 2,052,671 and 2,479,377 show an inclinometer where it is possible to produce more than one punch mark on the chart. U.S. Pat. No. 2,624,952 shows a double punch inclinometer capable of providing two punches on the chart at approximately 180° apart.

SUMMARY OF THE INVENTION

The present invention relates to a double punch inclinometer capable of providing two punches or marks on a chart at arcuately spaced positions approximately 165° apart. The punch marks are provided on the chart under such conditions that the chart moves into engagement with the marking element in a purely axial direction.

The apparatus on the present invention includes an elongated tubular housing which is adapted to be attached, at its upper end, to a conventional pendulum or marking device. An elongated camshaft is mounted concentrically within the housing and the upper end of this camshaft is attached to a chart holder upon which a conventional chart is received. A compression spring is received on the upper end of the camshaft for urging the camshaft in an upward direction tending to move the chart into contact with the pendulum. A torsional spring is also mounted within the housing for biasing the camshaft for rotary direction about the longitudinal axis of the housing in a given rotary direction. A latch is mounted within the housing below the camshaft and this latch is movable into two latching positions and an unlatched position successively by a control rod which is actuated by a timing device that includes a conventional clock mechanism.

The control rod has a portion thereon which bears against a circular cam which is rotated by the clock mechanism. The rod is urged downwardly by another spring means so that the cam contacting portion of the rod is in engagement with the circular cam. When the circular cam moves to the position where the cam contacting portion of the rod drops into a first recess, the rod allows the movement of the latch from its first latching position to its second latching position. When the circular cam moves further, the control rod drops into a second recess which allows the latch to move to its third or unlatched position. The lower end of the camshaft is provided with a pair of diametrically opposed feet which successively engage the latch in the first and second latching positions.

A cam member is mounted on the camshaft between the ends thereof and a camtrack is recessed into the periphery of this cam member. A roller, which constitutes a cam follower, is mounted on the end of a stud shaft which projects into the camtrack and which is secured to the housing.

When the latch is moved by the control rod from its first latching position to its second latching position, the first foot at the bottom of the camshaft is released and the camshaft is allowed to move vertically upwardly without any roatry motion until the chart comes into contact with the tip of the pendulum; this movement is made possible because the camtrack is provided with a first vertical recess in which the roller is allowed to ride in a relatively downward direction in relation to the cam member. (When the camshaft moves upwardly, the relative movement of the roller with respect to the camtrack is downward.) When the roller reaches the bottom of this first vertical recess, it enters into an upwardly inclined recess at which time the torsional spring exerts a force on the camshaft, forcing the roller to move along this inclined recess, and, pulling the chart holder downwardly away from the tip of the pendulum. When the roller meets the upper end of this first inclined recess, it enters a short horizontal recess at which time the second foot on the lower end of the camshaft is disposed under the latch, thereby locking the camshaft in this particular position. At this time, the roller is disposed over the top of a second vertical recess; however, since the second foot on the camshaft is now under the latch, downward movement of the roller relatively in this vertical recess is prevented.

When the cam contacting portion of the control rod engages the second recess in the circular cam after a predetermined period of time, the control rod drops further downwardly allowing the latch to move from its second latching position to its unlatched position; at this time, the camshaft is allowed to move directly vertically upwardly with no rotational movement so that the chart contacts the tip of the pendulum for a second time. Now the roller is at the bottom of the second vertical recess; however, the roller is also in position to enter a second upwardly inclined recess and the torsional spring immediately causes the camshaft to commence turning while the roller rides upwardly in this second inclined recess thereby pulling the cam holder downwardly away from the pendulum until the roller reaches the upward end of the second inclined recess. At this time, the inclinometer has completed its cycle and two punches or dimples have been made on the chart, and the inclinometer is ready to be pulled up to the surface.

At the surface, the pendulum device is removed, the chart can be replaced with a fresh chart and the device can be "re-cocked" by, first of all, resetting the timing device for the control rod, by thereafter pushing downwardly on the cam holder and rotating the camshaft against the action of the torsional spring. At this point, the roller enters an elongated horizontal recess which connects with the upper ends of the two vertical recesses previously described; the camshaft is turned until the roller engages the top of the first-mentioned recess at which time the downward pressure on the camshaft is relieved slightly and the roller now occupies the same position indicated above at the start of the cycle; the first foot at the bottom of the camshaft is now under the latch which is in its first latching position.

To prevent accidental "un-cocking" of the device when lowering it into a well bore, a safety latch is located in a radial recess in the inner housing such that the inner upper end of the latch is positioned below the cam member to prevent downward movement of the camshaft when the device is in the "cocked" condition. An inclined recess on the bottom of the cam member which will be positioned above the safety latch after the unit has "cycled" permits the manual "re-cocking" described above.

BRIEF DESCRIPTION OF THE DRAWINGS

FIG. 3 is a sectional view, on an enlarged scale, of the upper portion of the apparatus shown in FIG. 1 showing the relative positions of the various elements when the latch occupies its first latching position;

FIG. 4 is a view similar to FIG. 3, with certain parts in section and certain parts in elevation and showing the relative positions of the various elements immediately after the latch has been moved from the position shown in FIG. 1 to its second latching position;

DETAILED DESCRIPTION OF THE PREFERRED EMBODIMENT

Figure 1:
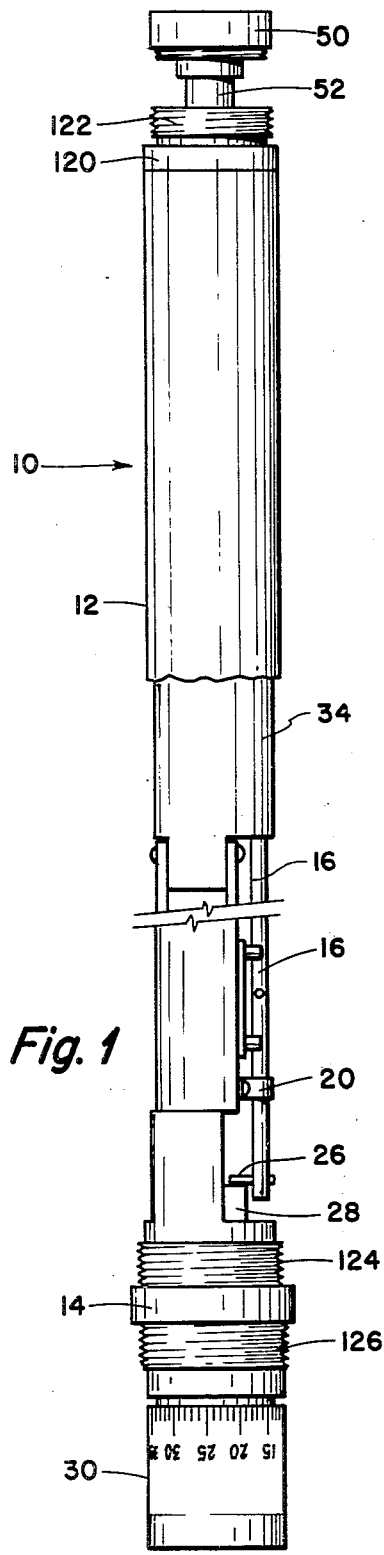
FIG. 1 is a fragmentary side elevation of an apparatus constructed in accordance with the present invention.
Figure 2:
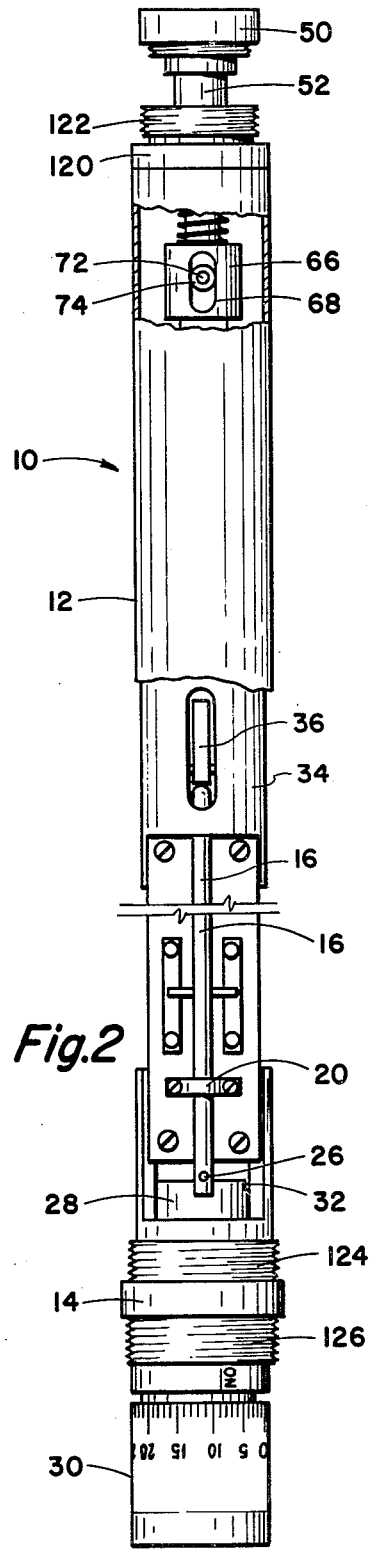
FIG. 2 is a fragmentary front elevation, partly in section, of the apparatus shown in FIG. 1.

Referring to the drawings in detail, FIGS. 1 and 2 show an inclinometer, generally designated by the reference number 10, and including an elongated tubular housing 12 which connects at its lower end with a coupling 14. An elongated control rod 16 is mounted for reciprocal vertical movement within the housing 12; the rod 16 is held against or on the housing 12 by means of a bracket 20 which is ultimately connected to the housing 12. The control rod 16 is urged continuously downwardly by means of a latch 36 (later to be described) which bears against the upper end of the control rod. The portion of the latch which bears against the control rod is also urged continuously downwardly by means of an extension spring 40 (later to be described). A pin 26 which projects radially inwardly adjacent the lower end of the control rod 16 rests against the upper surface of a circular cam 28. A suitable clock mechanism (not shown) is mounted in the lower end of the inclinometer and is provided with an output shaft (not shown) which is adpated to rotate the cam 28 about a vertical axis which is substantially coincident with the longitudinal vertical axis of the inclinometer itself. A dial 30 which is located at the lower end of the inclinometer is adapted to wind and set the clock mechanism in a manner not shown but which is considered to be essentially conventional. As the cam 28 is rotated by the clock mechanism, the pin 26 will ride along the upper surface on the cam until the recess or step 32 is reached at which time the control rod will drop downwardly for a purpose which will hereinafter appear. A second recess or step (not shown) spaced from the first recess 32 will cause the control rod 16 to drop to an even lower position after an interval of time and for a purpose which will also hereinafter appear.

Referring now also to FIGS. 3 and 4, the upper end of the control rod 16 projects into an inner housing 34 whih is mounted concentrically within the housing 12. A latch 36 mounted on a pivot rod 38 is positioned within the housing 34 above the upper end of the control rod 16. An extension spring 40 has its upper end engaging a cotter key 42 mounted in the latch 36, while the lower end of the spring 40 engages a pin 44 in a longitudinal bore 46 in the housing 34 and in which the extension spring 40 is received. The spring 40 urges the lower side of the latch 36 continuously against the upper end of the control rod 16.

A chart 48 is held in place by a chart retainer 50 which is screwed onto a chart holder 52. The chart holder 10 is secured to the upper end of a camshaft 54 by means of a pin 56. A clock spring 58 is mounted within a recess 60 in the housing 34 such that the outer end of the clock spring is secured to the housing 34 (in a manner not shown) and the inner end of the clock spring is secured to a rotatable spool 62 by means of a screw 64. A slotted cylindrical member 66, having vertical slots 68 and 70 on opposite sides thereof, is mounted above and constitutes a part of the rotatable spool shaped member 62. An axle 72 passes through a suitable hole in the shaft 54 in such a manner that the oppsite ends of the axle 72 project into the slots 68 and 70. Bearings 74 and 76 mounted at the ends of the axle 72 permit sliding movement up and down of the axle within the slots 68 and 70, respectively.

A compression spring 78 is received on the camshaft 54 in such a manner that the lower end of the spring bears against the upper end of the slotted cylindrical member 66. The upper end of the compression spring 78 bears against a collar 80 which is held in place by means of a retaining ring 82. Thus, the compression spring 78 tends to urge the camshaft 54 upwardly and, likewise, the spring 78 exerts a downward force on the slotted cylinder 66, the spool shaped member 62 and, finally, against the housing 34 through a bearing 84 which serves to mount the spool 62 rotationally within the housing 34.

A cam member 86 of larger diameter than the camshaft 54 itself, is attached to and integral with the camshaft 54 below the spool shaped member 62.

The camshaft 54 extends further downwardly below the cam member 86 in the form of a shaft 88 of somewhat smaller diameter than the upper portion of the camshaft 54, and this extension shaft 88 terminates in a pair of feet whic'1 extend radially outwardly from opposite sides of the lower end of the shaft portion 88. These feet are defined in terms of a small foot 90 and a large foot 92. In the position shown in FIG. 3, the upper end of the latch 36 engages the small foot 90 to hold the camshaft 54 and its associated elements in the position shown in this figure.

Figure 6:
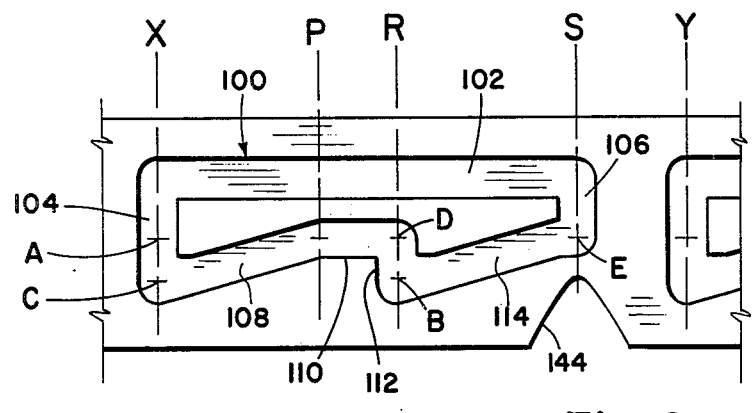
FIG. 6 constitutes a development in plane of the outer surface of the cam member shown in FIG. 5 with an extension of this plane development constituting a repetition of a portion of the surface pattern of the cam member.
Figure 5:
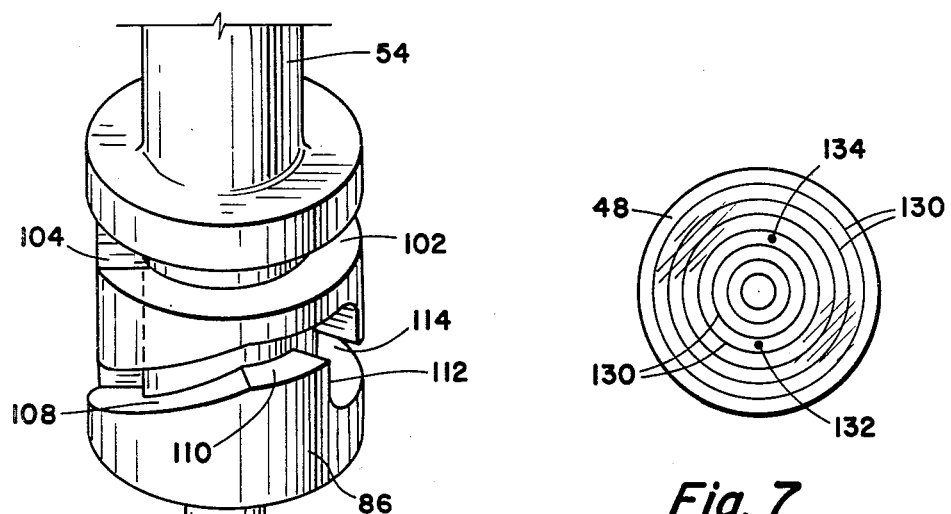
FIG. 5 is a perspective of the lower portion of the camshaft showing, particularly, the details of the cammed recess on the cam member.

A stud 94 is screwed into the housing 34 such that the inner end 96 projects into an internal camtrack in the cam member 86, which, internal camtrack will be further described in relation to FIGS. 5 and 6. A roller 98 surrounds the inner end 96 of the stud 94 so that the inner end of the stud can move within the camtrack as will hereinafter appear.

FIG. 6 represents, in a flat plane, the circumference of the cam member 86 plus a repetition of a portion of the cirumference of the member 86 for the sake of explanation. Actually, the circumference of the cam member 86 would extend, in plane, between the lines "X" and "Y" on FIG. 6, which represent 360° around the outside of the cam member 86. The internal camtrack, generally designated by the reference numeral 100 consists of a plurality of radially inwardly directed recesses lying in various horizontal vertical and inclined planes; thus, the upper portion of the camtrack includes a radial recess 102 which extends around the circumference of the cam member 86 in a substantially horizontal disposition for somewhat less than the full circumference of the cam member 86. At the opposite ends of the horizontal recess 102 are a pair of radially inwardly directed recesses 104 and 106 which extend in substantially vertical directions, the width of all of these recesses, by the way, being approximately equal to, or slightly greater than, the outer diameter of the roller 98 which surrounds the end 96 of the stud 94. From the lower end of the vertical recess 104, a radially inwardly directed recess 108 extends on an incline upwardly from the line "X" to a line "P". From the right-hand of the inclined recess 108 a short radially inwardly directed recess 110 extends horizontally approximately to the line "R". From the lower end of the horizontal recess 110 another short radially inwardly directed recess extends vertically downward along the line "R" to a termination point roughly corresponding with the lower termination point of the vertical recess 104. Finally, another radially inwardly directed recess 114 extends from the lower end of the vertical recess 112 on an incline upwardly to the lower end of the vertical recess 106, the center of which is defined by the line "S".

The upper end of the housing 12 connects with a coupling 120 which is threaded at its upper end as at 122 so as to receive a pendulum device (not shown). The pendulum device will be provided with a suitable pendulum therein (not shown) having a lower pointed end which is disposed above the chart 48 in such a manner that an upward movement of approximately ⅛ inch of the shaft 54 will cause the tip of the pendulum to impinge against the chart to leave a dimple mark or puncture therein indicating the relative vertical disposition of the pendulum and, hence, the drill pipe in which the inclinometer is disposed. The pendulum will be suspended from a point lying along the longitudinal center line of the inclinometer. However, some type of universal connection or suspension will permit the pendulum to hang freely such that the marking tip will always be on a time vertical line from its point of suspension when the pendulum is at rest.

The lower coupling 14 is provided with threaded portions 124 and 126 for threadily receiving a pair of upper and lower outer casings (not shown) which are adapted to completely encase the inclinometer as shown including, as well, the pendulum device referred to above which is not illustrated. The upper outer casing member (not shown) referred to above is also provided with means (not shown) for connecting with a suitable cable or other means (not shown) for lowering the inclinometer into the drill pipe or other tubular member whose vertical disposition is to be determined.

Operation

It will be assumed that a pendulum device (not shown) has been mounted on the threaded member 122, that the clock mechanism has been previously wound and set, that the various elements are in the relative positions shown in FIG. 3 and that the roller 98 is in the approximate location of the reference character "A" in FIG. 6. As the clock mechanism (not shown) or timer device times out, the pin 26 will fall into the recess 32 on the cam 28 such that the control rod 16 will drop to the position shown in FIG. 4. At this time the latch 36 will move away from the short foot 90 and the entire crank shaft 54 and associated structure including the chart 48 will move upwardly approximately ⅛ of an inch until the tip of the pendulum (not shown) impinges against, and leaves a dimple mark on, the chart 48; during this period of time, the roller 98 will move in the vertical recess 104 from the point "A" to the point "C" indicated in FIG. 6; at this point in time, the relative position of the various elements is represented by FIG. 4. However, once the roller reaches the position "C", the camshaft 54 is now capable of rotating under the action of the clock spring 58. The roller 98 now immediately begins to move along the inclined recess 108, simultaneously rotating the chart holder as the chart is withdrawn from the stylus or pendulum. As the roller 98 moves towards the right-hand end of the inclined recess 108, the camshaft 54 has now been pulled down almost to the same position as that shown in FIG. 3 and at which time, the large foot 92 passes under the edge of the latch 36, the roller 98 continues to move in the horizontal recess 112 until it reaches the position indicated by the reference letter "D" and which time both vertical and rotary motion ceases with respect to the crank shaft because further rotary motion is prevented by the right-hand side of the vertical slot 112, and, even though the roller is at the upper end of the vertical recess 112 downward movement therein is prevented by virtue of the fact that the latch 36 is disposed over the end of the large foot 92.

The timer mechanism continues to operate and the circular cam 28 is further rotated until the pin 26 drops into the second recess (not shown) at which time the control rod 16 drops further releasing the latch 36 from the large foot 92. Now the camshaft 54 is capable of moving upwardly vertically for a second time, and the roller 98 moves relatively from the position indicated at "D" to the position "B" at the lower end of the vertical recess 112 at which time the chart 48 again impinges against the lower pointed end on the pendulum (not shown) so as to leave a dimple mark or puncture in the chart 48 at a position approximately 180° (or perhaps somewhat less) removed from the first dimple mark. When the roller reaches the position "B", the shaft 54 is again capable of rotating under the action of the clock spring 54 and the roller begins to move upwardly in the inclined recess 114 pulling the chart downwardly away from the pendulum until the roller comes to rest at a position "E" which represents the right-hand end of the inclined slot 114 and the lower end of the vertical slot 106. This is the "home position" and the unit has completed the timing cycle, and has punched two times.

The clock mechanism or timing device (not shown) which is used to drive the circular cam 28 is essentially conventional and can be a 60-minute clock or a 45-minute clock, for example, depending upon the time required to lower the device 10 into the hole or well bore to the desired level below the ground. Whatever type clock mechanism is employed, the device 10 should be lowered to the desired position for a sufficient period of time prior to the engagement of the pin 26 with the recess 32 so that the pendulum device can come to rest. Generally speaking, approximately fifteen seconds is required for the pendulum to stop swinging assuming that the device 10, itself, has come to rest. The time interval between the time that the pin 26 enters the recess 32 and the time that it enters into the second recess (not shown) is preferably about one minute which, of course, is considerably in excess of the fifteen seconds required for the pendulum to stop swinging. As will be understood from the explanation set forth above, after the first marking of the chart, the rotary motion of the chart holder initially will cause the pendulum to swing but, of course, as soon as the roller 98 moves upwardly in the inclined slot 108, the chart 48 is now out of contact with the tip of the pendulum, and the pendulum merely needs an additional fifteen seconds in which to come to rest. After the second marking, the unit 10 is now taken out of the ground or pulled out of the well, the chart 48 is removed and examined.

Figure 7:
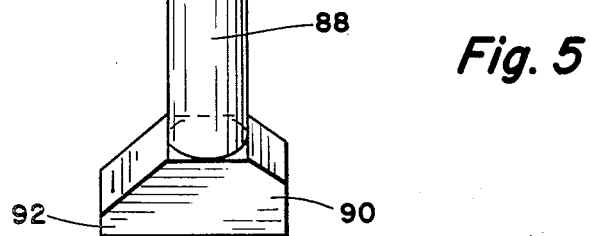
FIG. 7 is a plan view, on an enlarged scale, of a typical chart which might be employed with the apparatus of the present invention and showing marks thereon produced by the operation of the apparatus of this invention.

FIG. 7 illustrates a possible configuration for the chart 48 and showing its condition after removal from the chart holder 52. The chart 48 may be provided with a series of concentric circles 130, if desired, these circles representing the degrees of deviation from the vertical; these circles 130 may be individually marked on the face of the chart itself in a manner not shown to indicate the degrees represented by each circle. The circles 132 and 134 represent the punctures or the dimples produced on the chart by the marking tip (not shown) of the pendulum for the two upward movements of the chart into engagement therewith. Since the vertical recesses 104 and 112 on the cam 86 are approximately 165° apart, as represented by the positions of the lines "X" and "R", the dimples 132 and 134 will also be approximately 165° apart.

With the pendulum unit removed, a new chart is placed in the chart holder, the timing mechanism for the cam 28 is reset which repositions the rod 16 to the position shown in FIG. 3. The chart holder 50 is grasped and forced axially downward so that the roller 98 moves relatively to the upper end of the vertical recess 106. At this time, the chart holder 50 is rotated against the action of the spring 58 and the roller 98 moves to the left in the horizontal recess 102 until the vertical recess 104 is encountered. At this point, the downward pressure against the chart holder is relaxed so that the camshaft 54 is elevated slightly so that the roller 98 moves to the position "A" at which time the latch 36 engages the small foot 90 as previously described. Now the cycle is ready to be repeated.

From the foregoing it will appear that the camtrack permits the chart holder to move only in an axial direction whereby the stylus pendulum strikes the chart without rotation. After the detent or puncture has been made on the chart, then rotation can occur.

Occasionally, the above-described inclinometer can become "uncocked" when the unit is severely jarred. That is, if the unit is lowered into the well bore in such a manner that it comes to a sudden and abrupt stop, it is possible that the camshaft 54 and associated structure could move downwardly by inertia; under the circumstances, when the shaft 54 and associated structure move downwardly in relation to the outer housing 12 and the inner housing 34, the cam follower 96, 98 will move relatively upwardly in the vertical recess 104 into the horizontal recess 102, at which time the torsional spring 58 will rotate the shaft 54 such that the cam follower moves relatively to the right-hand end of the horizontal recess 102, thereby preventing the device from moving in the desired manner to produce the two marks on the chart. In order to overcome the above-described difficulty, the inner housing 34 is provided with a radial opening or recess 138 in which a safety latch 140 is mounted. The safety latch connects with a flat leaf spring 142 which is secured at its lower end to the housing 34 by a screw or other convenient means. The safety latch 140 is in the form of a metallic block or rod whose upper end projects into the interior space within the housing 34 so as to be positioned below the bottom end of the cam member 86 as shown in FIGS. 3 and 4. As the inclinometer is now lowered into the well bore in a "cocked" condition, the camshaft 54 is prevented, by the safety latch 130, from being lowered to where the cam follower 96, 98 would be positioned opposite the horizontal recess 102. On the other hand, it is necessary to "re-cock" the unit after it has completed its cycle. For this purpose, an inclined recess or chamfer 144 is provided along the bottom of the cam member 86. Since the distance (or degree of revolution) between the vertical recesses 104 and 106 has to be less than 360°, it follows that the distance between lines X and S on FIG. 6 has to be less than 360°. In the embodiment disclosed herein the actual "distance" between lines X and S is approximately 283°, but, of course, this distance could be somewhat greater or somewhat smaller. With the above considerations in mind, the inclined recess 144 shown in both FIGS. 3 and 4 would be in a position approximately 283° removed from the safety latch 140 when the device is in the cocked position shown in FIG. 3.

Actually, for the reasons described above, the recess 144 would not be visible in FIGS. 3 and 4 if the latter were true cross-sections through the inclinometer; however, for purposes of illustration only, the position of the recess 144 has been rotated back from its true position at 283° from the latch 140 to an illustrative position at 180° from the latch.

When the unit has cycled, as described above, the camshaft 54 will have rotated approximately 283°, at which time the inclined recess 144 will be disposed above and adjacent the safety latch 140. Now, a downward push on the camshaft 54 will bring the inclined recess 144 into engagement with the safety latch 140 so as to push the safety latch radially outwardly against the action of the leaf spring 142 such that the unit can be manually "re-cocked" in the manner described above.

What is claimed is:

1. In a device for determining the inclination of a well bore at a given depth which includes a longitudinally extending housing adapted to be lowered into the well bore to said depth, wherein the longitudinal central axis of said housing is substantially parallel with said well bore at said depth whereby said housing assumes the same inclination of said well bore at said depth, wherein a marking element is suspended from a point the central axis of said housing with a marking tip at the lower end of said element located on a true vertical line from said point, and wherein a chart member is mounted in said housing below said marking element and normally spaced from the marking tip thereon, said chart member being movable along said longitudinal axis of said housing and upwardly into a predetermined upper position for engagement with said marking tip, whereby said marking tip will make a mark on said chart member and whereby the position of said mark on said chart member relative to the center thereof provides an indication of the inclination of said well bore at said depth; the improvement which comprises a circle chart constituting said chart member; a circular chart holder for holding said chart thereon; a longitudinally extending camshaft mounted in said housing for axial movement along the longitudinal axis of said housing and also for rotational movement about said axis, said camshaft having an upper end connected to said chart holder; compression spring means within said housing for urging said camshaft in an upward axial direction; torsional spring means coacting between said housing and said camshaft for urging rotation of said camshaft in a given rotary direction; a pivotal latch mounted in said housing below said camshaft and movable from a first latching position to a second latching position and to a third unlatched position; a control rod engageable with said latch for moving said latch successively from said first latching position to said second latching position and to said third unlatched position in response to timed movement of said control rod; said camshaft having a lower end with an axial extension thereon terminating in a pair of diametrically opposed radial feet, one of said radial feet being adapted to engage said latch in said first latching position to hold said camshaft in a downward position against the action of said compression spring means, the other of said radial feet being adapted to engage said latch in said second latching position to hold said camshaft in a downward position against the action of said compression spring means; cam means mounted on said camshaft and cooperating with said housing for first guiding the upward movement of said camshaft in an axial direction only in response to the movement of said latch from said first latching position to said second latching position as a result of a first timed movement of said control rod whereby said one foot is released from engagement with said latch and whereby said chart is urged upwardly without rotation into said predetermined upper position, said cam means thereafter guiding said camshaft rotationally in said given rotary direction and through a first predetermined degree of rotational movement while simultaneously forcing said camshaft downwardly whereby said chart is lowered from its predetermined upper position and whereby said other radial foot engages said latch when said first predetermined degree of rotational movement is achieved, said cam thereafter guiding said camshaft for a second upward movement in response to the movement of said latch from said second latching position to said third unlatched position as a result of a second timed movement of said control rod whereby said other foot is released from engagement with said latch and whereby said chart is urged upwardly again without rotation into said predetermined upper position, said cam thereafter guiding said camshaft rotationally in said given direction and through a second predetermined degree of rotational movement while simultaneously forcing said camshaft downwardly whereby said chart is lowered from its predetermined upper position and whereby said camshaft ceases movement after said second predetermined degree of rotational movement is achieved.

2. The improvement according to claim 1 wherein said means includes a cylindrical cam member having a raceway therein, said raceway being comprised of a plurality of radially inwardly directed and interconnecting recesses, and wherein said housing is provided with a stud having a portion projecting inward into said raceway and a roller mounted on the projected portion of said stud.

3. The improvement according to claim 2 wherein said recesses include a first vertically directed recess having an upper end and a lower end, a first inclined recess having a lower end connecting with the lower end of said first vertical recess and extending upwardly and circumferentially away from said first vertical recess in a given circumferential direction to an upper end, a first and short horizontal recess having a first end and a second end, said first horizontal recess being connected at its first end with the upper end of said first inclined recess and extending circumferentially therefrom in said given circumferential direction, a second short vertically directed recess having an upper end and a lower end, the upper end of said second vertical recess connecting with the second end of said first horizontal recess, and a second inclined recess having a lower end and an upper end, the lower end of said second inclined recess connecting with the lower end of said second vertical recess, a third vertical recess having a lower end connecting with the upper end of said second inclined recess and having an upper end terminating at approximately the same level as the upper end of said first vertical recess and a second and elongated horizontally directed recess connected from the upper end of said third vertical recess to the upper end of said first vertical recess.

4. The improvement according to claim 1 wherein said housing is provided with a radial opening, a safety latch positioned in said radial opening and having an upper end positioned below said cam means, leaf spring means for urging said safety latch into position beneath said cam means, said cam means being provided with an inclined recess which is engageable with the upper end of said safety latch upon downward manual movement of said camshaft after said camshaft ceases movement following its second predetermined degree of rotational movement.

* * * * *